United States Patent
Riddle et al.

(10) Patent No.: US 11,279,817 B2
(45) Date of Patent: Mar. 22, 2022

(54) RUBBER COMPOSITION AND METHOD FOR MAKING THEREOF

(71) Applicant: Kraton Polymers LLC, Houston, TX (US)

(72) Inventors: Neil Riddle, Almere (NL); Noriko Yagi, Tokyo (JP); Jeremie G Pichereau, Almere (NL)

(73) Assignee: KRATON POLYMERS LLC, Houston, TX (US)

( * ) Notice: Subject to any disclaimer, the term of this patent is extended or adjusted under 35 U.S.C. 154(b) by 387 days.

(21) Appl. No.: 16/564,424

(22) Filed: Sep. 9, 2019

(65) Prior Publication Data

US 2020/0079935 A1    Mar. 12, 2020

Related U.S. Application Data

(60) Provisional application No. 62/729,065, filed on Sep. 10, 2018.

(51) Int. Cl.
| | | |
|---|---|---|
| C08L 9/00 | (2006.01) | |
| B60C 1/00 | (2006.01) | |
| C08L 53/02 | (2006.01) | |
| C08K 5/00 | (2006.01) | |
| C08K 5/101 | (2006.01) | |
| C08L 15/00 | (2006.01) | |
| C08L 23/16 | (2006.01) | |
| C08L 7/00 | (2006.01) | |
| C08K 3/013 | (2018.01) | |
| C08K 3/36 | (2006.01) | |
| C08K 3/26 | (2006.01) | |

(52) U.S. Cl.
CPC ............. *C08L 9/00* (2013.01); *B60C 1/0016* (2013.01); *C08K 5/0016* (2013.01); *C08K 5/101* (2013.01); *C08L 7/00* (2013.01); *C08L 15/005* (2013.01); *C08L 23/16* (2013.01); *C08L 53/025* (2013.01); *C08K 3/013* (2018.01); *C08K 3/36* (2013.01); *C08K 2003/265* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,738,892 A | 4/1988 | Canova | |
| 7,244,785 B2 | 7/2007 | Bening et al. | |
| 2004/0146541 A1* | 7/2004 | Chen | C08K 5/0016 424/405 |
| 2013/0225020 A1* | 8/2013 | Flood | C08F 8/04 442/1 |
| 2013/0299731 A1* | 11/2013 | Wright | C08L 25/06 252/62 |
| 2014/0076473 A1* | 3/2014 | Abad | B60C 11/0008 152/209.1 |
| 2015/0361210 A1* | 12/2015 | Nosaka | C08L 15/00 524/575 |
| 2016/0339743 A1 | 11/2016 | Abad et al. | |
| 2018/0171118 A1* | 6/2018 | Yuri | C08L 15/00 |

FOREIGN PATENT DOCUMENTS

| | | |
|---|---|---|
| EP | 2963087 A1 | 1/2016 |
| WO | 2012/152686 A1 | 11/2012 |

OTHER PUBLICATIONS

Innovation Q plus, PG pub search (Year: 2021).*
Google scholar search (Year: 2021).*

* cited by examiner

*Primary Examiner* — Peter A Salamon

(57) ABSTRACT

A rubber composition is disclosed. The composition comprises a blend based on 100 parts by weight (phr) of diene elastomers: 5 to 95 phr of a first diene elastomer, 5 to 50 phr of a hydrogenated styrenic block copolymer (HSBC), 50 to 200 phr of a filler, up to 25 phr of a plasticizer. The HSBC has a melt flow ratio of 1.0 to 50.0 measured according to ASTM D-1238 at 230° C. and 2.16 kg load, a Shore A hardness of 40 to 80 measured according to ASTM D-2240, a DMA peak tan delta temperature of 0° C. to 40° C. at 1 Hz measured according to ASTM D-4065, and an order-disorder transition temperature of 200° C. to 300° C. The composition does not comprise a resin, a plasticizer, or comprises a resin or a plasticizer in an amount of less than 20 phr.

20 Claims, No Drawings

RUBBER COMPOSITION AND METHOD FOR MAKING THEREOF

RELATED APPLICATIONS

This application claims priority from U.S Provisional Application No. 62/729,065, with a filing date of Sep. 10, 2018, the entire disclosures of which is incorporated herein by reference for all purposes.

FIELD

The disclosure relates to compositions for use in tire applications.

BACKGROUND

Tire treads are typically expected to have excellent traction and handling properties, wet skid resistance, low rolling resistance, and good wear characteristics. These properties depend, to a great extent, on the dynamic viscoelasticity properties of the rubber compositions used in making the tires.

For improved performance, tire compositions typically contain up to 20 phr, or sometimes up to 75 phr of a resin, e.g., a resin containing substituted or unsubstituted units derived from cyclopentadiene homopolymer or copolymer, a terpene-based resin, or a rosin-derived material including rosin esters or oligoester resins.

There is an interest in reducing cost, i.e., reducing the amount of resins and/or plasticizer used in a tire composition while still maintaining the required wet grip and rolling resistance properties.

SUMMARY

In one aspect, a tire composition is disclosed. The composition comprises: based on hundred parts (phr) of total amount of diene elastomers: a first diene elastomer in an amount of 5 to 95 phr, selected from polybutadienes, natural rubber, synthetic polyisoprenes, butadiene copolymers, isoprene copolymers and mixtures thereof; a second diene elastomer in an amount of 5 to 50 phr, comprising a hydrogenated styrenic block copolymer (HSBC); 50 to 200 phr of a filler; up to 25 phr of a plasticizer; wherein the HSBC has a formula A-B-A, $(A-B-A)_nX$ or $(A-B)_nX$, where n is an integer from 2 to 30, and X is residue of a coupling agent. Prior to hydrogenation, each A block is a monoalkenyl arene homopolymer block having a true peak molecular weight of 5 kg/mol to 15 kg/mol, and each B block has a true peak molecular weight of 30 kg/mol to 200 kg/mol, and is a controlled distribution copolymer block of at least one conjugated diene and at least one monoalkenyl arene. In embodiments, the coupling efficiency is 30%-95%; and a midblock monoalkenyl arene blockiness index is 3% to 15%, wherein the mono alkenyl arene blockiness index is the proportion of mono alkenyl arene units in the block B having two mono alkenyl arene neighbors on the polymer chain. Subsequent to hydrogenation, 0-10% of the arene double bonds have been reduced, at least 90% of the conjugated diene double bonds have been reduced. The HSBC has a midblock poly(monoalkenyl arene) content of 20 wt. % to 70 wt. % based on the total weight of the midblock. The HSBC has a melt flow ratio of 1.0 to 50.0 measured according to ASTM D-1238 at 230° C. and 2.16 kg load, a Shore A hardness of 40 to 80 measured according to ASTM D-2240, a DMA peak tan delta temperature of 10° C. to 40° C. at 1 Hz measured according to ASTM D-4065, and an order-disorder transition temperature of 200° C. to 300° C. In embodiments, the tire composition does not comprise a resin, or a plasticizer, or comprises less than 20 phr of a resin and or a plasticizer.

In one aspect, the rubber composition comprises no resin, with at least 10 phr of the hydrogenated styrenic block copolymer (HSBC), and the composition has a tan δ that is within 10% of tan δ of a composition containing a resin in an amount comparable to the amount of the HSBC with a plasticizer or a resin.

In yet another aspect, the rubber composition when used for a tire exhibits at least one of a wet grip property, or a dry handling of at least 3% higher than a rubber composition without the HSBC.

DESCRIPTION

The following terms will have the following meanings.

"phr" means parts per hundred parts of elastomer (rubber).

"Elastomer" can be used interchangeably with the term "rubber," or "diene elastomer," referring to any polymer or combination of polymers consistent with ASTM D1566 definition.

"Mid-block styrene blockiness" means the proportion of styrene units in a polymer having two styrene units as the nearest neighbors on the polymer chain. The styrene blockiness can be determined by 1H NMR spectroscopy using the methodology described in U.S. Pat. No. 7,244,785 B2.

"Controlled distribution" refers to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) monoalkenyl arene units; and (3) an overall structure having relatively low blockiness. The term, "'rich in" is defined as greater than the average amount, preferably greater than 5% of the average amount.

"Molecular weight" in the context of block copolymers refers to the apparent molecular weight, or the number average molecular weight (Mn) of the block copolymer, as measured with gel permeation chromatography (GPC) using polystyrene calibration standards (using a method analogous to the method described in ASTM D5296-05). The "number average molecular weight" is also referred to as "styrene equivalent molecular weight", or "apparent molecular weight". The molecular weights measured at the peak of the GPC trace are commonly referred to as "styrene equivalent peak molecular weights". The peak position is used, since the differences between the peak molecular weight ($M_p$) and the number average molecular weight are generally very small. The styrene equivalent molecular weight may be converted to "true molecular weight" when the styrene content of the polymer and the vinyl content of the diene segments are known.

Dynamic mechanical properties are measured via dynamic mechanical analysis (DMA) by a temperature-sweep in double shear mode from −60° C. to 100° C. with 1° C./min at 10 Hz and 0.1% (−60° C. till −5° C.) and 3% (−5° C. till 100° C.) dynamic strain using a Metravib +450N.

Tire Tread Wet Performance Predictive Properties are evaluated through the

DMA by the Tan Delta at 0° C. (tan δ0° C.) and higher value of the index of wet grip performance, are predictive of better wet grip performance.

"Tangent delta," or "tan delta," or "tan δ" is expressed by a ratio of the measurement of energy lost as heat (loss modulus) versus the energy stored and released (storage modulus). Tan delta and other relating viscoelastic properties can be obtained using a dynamic viscoelastic tester. Good wet traction is predicted by a high value for G' (loss modulus) and tan delta at 0° C. Low rolling resistance is predicted by low tangent delta values at 50° C. and higher temperatures. Tan delta at 100° C. can be used as an indicator of tire grip and other enhanced performance characteristics under extreme use conditions.

Tire Tread Dry Grip Predictive Properties are evaluated through DMA by tan delta at 30° C. (tan δ30° C.) and higher values of the index of dry grip, are predictive of beneficial improvement in tire dry grip.

Tire Tread Rolling Resistance Predictive Properties are evaluated through the DMA by Tan Delta at 60° C. (tan δ60° C.) and lower values of the index of fuel efficiency. They are predictive of beneficial reduction in tire rolling resistance.

Index of wet grip performance=(tan δ0° C. Comparative Example)/(tan δ0° C. of reference formulation)×100.

Index of dry grip=(tan δ30° C. Comparative Example)/(tan δ30° C. of reference formulation)×100.

Disclosed herein is a composition that can be used for a number of applications, including tires. The composition comprises two diene elastomer components, with the first diene elastomer component being a rubber in the prior art, and the second diene elastomer component being a hydrogenated styrene block copolymer. In embodiments, the composition does not comprise a resin, or comprises a resin system with the total resin content of less than 20 phr, and preferably less than 15 phr.

First Diene Elastomer Component—Rubber: The first diene elastomer component is a "rubber" component as typically used in tire compositions, comprising any of unsaturated diene elastomer selected from polybutadienes, natural rubber, synthetic polyisoprenes, butadiene copolymers, isoprene copolymers and mixtures thereof. If natural rubber is present, it includes both natural rubber and its various raw and reclaimed forms.

In embodiments, the first diene elastomer component is selected from butyl rubber, halogenated butyl rubber, and EPDM (Ethylene Propylene Diene Monomer rubber), and mixtures thereof. In embodiments, the first diene elastomer component is selected from natural rubber (NR), styrene-butadiene rubber (SBR), butadiene rubber, synthetic polyisoprene rubber, epoxylated natural rubber, polybutadiene rubber, e.g., high-cis polybutadiene rubber; nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

The first diene elastomer may be coupled, star-branched, branched, and/or functionalized with a coupling and/or star-branching or functionalization agent. In embodiments, the rubber is end-group functionalized to improve its affinity for fillers, such as carbon black and/or silica. Examples of coupling and/or star-branching or functionalizations include coupling with carbon black as a filler, e.g., with functional groups comprising a C–Sn bond or of aminated functional groups, such as benzophenone; silanol functional groups or polysiloxane functional groups having a silanol end; alkoxysilane groups, polyether groups. In embodiments, the first diene elastomer component is end-chain functionalized with a silanol group. In yet another embodiment, the rubber is epoxide-functionalized (or epoxidized), bearing epoxide functional groups.

The first diene elastomer component comprises from 50 to 95 phr (based on 100 parts total of first and second diene elastomer components), with the remainder being a hydrogenated styrenic block copolymer (HSBC) as the second component.

Second Diene Elastomer Component—HSBC: The HSBC composition has a structure of A-B-A, $(A-B)_n$, $(A-B-A)_n$, $(A-B)_nX$, $(A-B-A)_nX$, or mixtures thereof, where n is an integer from 2 to 30, and X is residue of a coupling agent. Prior to hydrogenation, the A block is a monoalkenyl arene homopolymer block having a true peak molecular weight of preferably 5 kg/mol to 15 kg/mol; and each B block is a controlled distribution copolymer block of at least one conjugated diene and at least one monoalkenyl arene, and has a true peak molecular weight of 30 kg/mol to 200 kg/mol. Further, the midblock monoalkenyl arene blockiness index is preferably 5% to 10%. Subsequent to hydrogenation, the midblock poly(monoalkenyl arene) content in the hydrogenated SBC is 20 wt. % to 50 wt. % based on the total weight of the midblock. In embodiments, the coupling efficiency is 30-95% for HSBC having a structure of $(A-B)_nX$, $(A-B-A)_nX$.

In embodiments, the A block has a true peak molecular weight of 5 kg/mol to 15 kg/mol. In embodiments, the B block has a true peak molecular weight of 30 kg/mol to –200 kg/mol, or 30-150 kg/mol. In an embodiment, the mid-block monoalkenyl arene blockiness index is 3% to 15%. In other embodiments, the hydrogenated SBC has a mid-block poly (monoalkenyl arene) content of 35-65 wt. %, 40-65 wt. %, or 40-60 wt. %. In some embodiments, prior to hydrogenation, the SBC has a midblock vinyl content from 30-90 mol percent, 50-70 mol percent, 30-40 mol percent, or 35-40 mol percent. In embodiments, the total molecular weight of the hydrogenated SBC is from 60-200 kg/mol, or 80-120 kg/mol. In other embodiments, the overall block copolymer after hydrogenation has a total poly(monoalkenyl arene) content of 40-80 wt. %, 50-70 wt. %, or 60-70 wt. %.

In embodiments, a linear HSBC has a total apparent number average molecular weight from 70 to 150 kg/mol, and a branched HSBC has a total apparent number average molecular weight from 35 to 75 kg/mol per arm. In other embodiments, each B block comprises terminal regions adjacent to the A blocks that are rich in conjugated diene units and one or more regions not adjacent to the A blocks that are rich in mono alkenyl arene units, the weight percent of mono alkenyl a rene in each B block is from 10 to 40 weight percent, each B block has a styrene blockiness index of less than 10 percent, and the weight percent of vinyl in each B block is at least 40 weight percent.

The hydrogenated SBC can be prepared by methods known in the art. They are generally prepared by contacting the monomer or monomers with an organoalkali metal compound in a suitable solvent, at a temperature range from −150° C.-300° C., preferably at a temperature range of 0-100° C. Hydrogenation of the pendant vinyl groups and in-chain double bonds present in the block copolymer chain is carried out under conditions such that at least 90 mol %, at least 95 mol %, or at least 98 mol % of the vinyl groups are reduced, and 0-10 mol % of the arene double bonds are reduced. A suitable catalyst based on nickel, cobalt or titanium is used in the hydrogenation step.

Suitable monoalkenyl arene compounds useful for making the A and B blocks include those having 8 to 20 carbon atoms and include styrene, o-methylstyrene, p-methylstyrene, p-tert-butyl styrene, 2,4-dimethyl styrene, alpha-methyl styrene, vinylnaphthalene, vinyltoluene and vinylxylene, or mixtures thereof. In an embodiment, the monoalkenyl arene is styrene.

Suitable conjugated dienes include those having from 4 to 8 carbon atoms, for example 1,3-butadiene, isoprene, 2,3-dimethyl-1,3-butadiene, 1,3-pentadiene and 1,3-hexadiene. Mixture of such dienes can also be used. In an embodiment, the conjugated diene is 1,3-butadiene. In another embodiment, the conjugated diene is a mixture of 1,3-butadiene and isoprene.

The HSBC composition has a melt flow ratio in any of the ranges: 1.0-10.0, 1.0-50.0, 2.0-8.0, 4.0-8.0, and 4.0-6.0, when measured according to ASTM D-1238 at 230° C. and 2.16 kg load. The HSBC composition has a Shore A hardness of 60 to 80 in one embodiment, 60-70 in another embodiment, and 70-80 in yet another embodiment, measured according to ASTM D-2240.

The HSBC composition has a DMA peak tan delta in any of 0° C.-40° C., 10° C.-40° C., or 10° C.-20° C., or 20° C.-30° C., and 30° C.-40° C., according to ASTM D-4065.

The HSBC composition has an order-disorder temperature (ODT) in the range of 200° C.-300° C., 220° C.-280° C., 240° C. to 260° C., or 220° C. to 260° C.

The HSBC compositions have a tensile strength in any of 10-30 MPa, 10-20 MPa, and 7.5-15.0 MPa, measured according to ASTM D412.

The HSBC composition has a relatively stable hardness over a wide range of use temperature, with a rate of change of elastic modulus ($\Delta$G0° C.-40° C.) from −9 MPa/° C. to −25 MPa/° C., or from −12 MPa/° C. to −22 MPa/° C., or −15 MPa/° C. to −20 MPa/° C., measured over a temperature range of 0° C. to 40° C. according to ASTM 1640-99. In embodiments, the HSBC composition has a rate of change of elastic modulus ($\Delta$G20° C.-40° C.) from −9 MPa/° C. to −25 MPa/° C. over temperature range of 20° C. to 40° C. according to ASTM 1640-99.

In embodiments, the HSBC composition has an elongation of at least 600%, or at least 700%, or from 500% to 1000% measured according to ASTM D412.

The HSBC composition can also have a combination of two or more of the properties which fall within the various ranges described above. In an embodiment, the HSBC composition has a melt flow ratio of 1.0-10.0; a Shore A hardness of 60-80; a DMA peak tan delta temperature of 10° C. to 40° C., and an order-disorder transition temperature of 200° C.-300° C. In another embodiment, the HSBC composition has a melt flow ratio of 4.0-8.0; a Shore A hardness of 70-80; a DMA peak tan delta temperature of 15° C.-30° C., and an order-disorder transition (ODT) temperature of 200° C.-250° C.

Optional Resin Component: The diene elastomer components described above are sufficient by themselves for a tire composition to be usable without any resin component, or if it comprises an optional resin component, the amount is less than 25 phr, or less than 20 phr, or less than 15 phr, or less than 10 phr, or preferably less than 5 phr, e.g., between 0.5 phr and 5 phr, 0 phr.

Un-limiting examples of the resin that can be used optionally include substituted or unsubstituted units derived from cyclopentadiene homopolymer or copolymer resins (referred to as CPD), dicyclopentadiene homopolymer or copolymer resins (referred to as DCPD or (D)CPD), terpene homopolymer or copolymer resins, rosin derived resins, rosin/rosin esters, pinene homopolymer or copolymer resins, C5 fraction homopolymer or copolymer resins, C9 fraction homopolymer or copolymer resins, alpha-methylstyrene homopolymer or copolymer resins, and combinations thereof. In one embodiment, the resin may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/C5 fraction copolymer resins, (D)CPD/C9 fraction copolymer resins, terpene/vinylaromatic copolymer resins, terpene/phenol copolymer resins, pinene/vinylaromatic copolymer resins, pinene/phenol resins, C5 fraction/vinylaromatic copolymer resins, and combinations thereof.

In one embodiment, the optional resin is selected from a terpene-based resin, a rosin ester, or an oligoester resin.

Optional Plasticizer Component: "Plasticizer" (also referred to as a processing oil), refers to a petroleum derived processing oil and synthetic plasticizer to extend elastomers and improve the processability of the composition. Suitable plasticizers include, but are not limited to, aliphatic acid esters, hydrocarbon processing oils, tall oil pitch and modified tall oil pitch, and combinations thereof. The amount of plasticizer is present in an amount of 0-35 phr, or 5 to 25 phr, or less than 20 phr. In a third embodiment, the plasticizer is present in an amount of weight ratio of resin to plasticizer is greater than 1. In a second one embodiment, the weight ratio of resin to plasticizer is greater than 3. In a third embodiment, greater than 6.

In one embodiment, the plasticizer is a modified tall oil pitch selected from the group of a pitch ester, a decarboxylated tall oil pitch, a soap of tall oil pitch, a thermally treated tall oil pitch, and a thermally and catalytically treated tall oil pitch.

In one embodiment, the plasticizer include both extending oil present in the elastomers, and process oil added during compounding. Suitable process oils include aromatic, paraffinic, naphthenic, and low PCA oils, such as MES, TDAE, and heavy naphthenic oils, and vegetable oils such as sunflower, soybean, and safflower oils. Examples of low PCA oils include those having a polycyclic aromatic content of less than 3 percent by weight. Suitable vegetable oils include, for example, soybean oil, sunflower oil and canola oil which are in the form of esters containing a certain degree of unsaturation.

Coupling Agents: In embodiments, the rubber composition further comprises coupling agents, e.g., any agent capable of facilitating stable chemical and/or physical interaction between two otherwise non-interacting species, e.g., between a filler such as silica and an elastomer. The coupling agents can be premixed, or pre-reacted, with the filler particles or added to the rubber mix during the rubber/silica processing, or mixing, stage. Examples include sulfur-based coupling agents, organic peroxide-based coupling agents, inorganic coupling agents, polyamine coupling agents, resin coupling agent sulfur compound-based coupling agents, oxime-nitrosamine-based coupling agents, and sulfur. In embodiments, the coupling agent is at least bifunctional. Examples include organosilanes or polyorganosiloxanes. In embodiments, the coupling agent is any of silane sulphide, silane polysulfides, and combinations thereof.

The coupling agent is present in 1 to 20 phr, or 1 to 10 phr, or 3 to 15 phr.

Filler Components: In one embodiment, the composition further includes fillers in an amount from 50 to 200 phr. Examples include, but are not limited to, calcium carbonate, carbon nanotube, clay, mica, silica, silicates, talc, titanium dioxide, alumina, zinc oxide, starch, wood flour, carbon black, or mixtures thereof, of any size and typically range from 0.0001 μm-100 μm. Other fillers can be used include, but are not limited to, particulate fillers including ultra-high molecular weight polyethylene (UHMWPE), particulate polymer gels, and plasticized starch composite fillers known in the art.

In embodiments, the fillers are surface-treated, e.g., a silica material coated or reacted with terpene derived silanes, e.g., an alkoxy terpene epoxy silane as disclosed in U.S. Pat. No. 4,738,892. In another embodiment, the filler is treated in the presence of a functional moiety, such as at least one of an organosilane, an organotitanate or an organozirconate. In one embodiment prior to being mixed into the rubber composition, the filler is first surface-treated with a coupling agent such as aminosilane, hexamethyldisilazane (HMDS), or vinyltriethoxysilane. In another embodiment, the fillers are physically coated or covered with a resin.

The composition can further include 5 to 100 phr of carbon black. The carbon black in one embodiment has an iodine absorptions ranging from 9 to 145 g/kg and DBP number ranging from 34 to 150 cm3/100 g. In embodiments, the composition includes 5 to 125 phr of a filler, or 20-60 phr, or 30-50 phr, or 40-60 phr, or at least 50 phr.

Cross-Linking Agents: In one embodiment, the rubber in the composition can be crosslinked by adding curative agents, for example sulfur, metals, metal oxides such as zinc oxide, peroxides, organometallic compounds, radical initiators, fatty acids, and other agents common in the art. Zinc oxide, typically at 5 phr, is added to form zinc halide that then acts as the catalyst for the vulcanization of the rubber compounds. Other known methods of curing that can be used include, peroxide cure systems, resin cure systems, and heat or radiation-induced crosslinking of polymers. Accelerators, activators, and retarders may also be used in the curing process.

The cross-linking agent is present in 0.3-10 phr, or 0.5-5.0 phr, or at least 0.5 phr.

Other Additives: The composition can be compounded with other components known in the art in amounts of up to 10 phr, e.g., sulfur donors, curing aids, such as accelerators, activators and retarders and processing additives, pigments, fatty acid, zinc oxide, waxes, antioxidants and antiozonants and peptizing agents.

Methods for Forming: The rubber composition can be formed by methods known to those having skill in the rubber mixing art. For example, the components are typically mixed in two or two stages, for example, at least one non-productive stage followed by a productive mix stage. The final curatives, e.g., sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

The composition can be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working can be from 1 to 20 minutes.

Properties of the Rubber Composition: In one embodiment wherein the composition includes no resin, and wherein the hydrogenated styrenic block copolymer (HSBC) is present in an amount of at least 10 phr, the composition is observed to have a tan δ that is within 10% of tan δ of a composition containing a resin in an amount comparable to the amount of the HSBC. When used for tire applications, the rubber composition exhibits at least one of a wet grip property, or a dry handling of at least 3% higher than a rubber composition without the HSBC.

Industrial Applicability: In tire applications, the composition are useful in components for a variety of tires such as truck tires, bus tires, automobile tires, motorcycle tires, off-road tires, aircraft tires, and the like. The compositions may also be fabricated into a component of a tire, e.g., treads, sidewalls, chafer strips, tire gum layers, reinforcing cord coating materials, cushion layers, and the like.

Besides tire applications, the composition can be extruded, compression molded, blow molded, injection molded, and laminated into various shaped articles including fibers, films, laminates, layers, industrial parts such as automotive parts, appliance housings, consumer products, packaging, and the like. The composition can also useful in a variety of applications, particularly tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. The composition can also be used in molded rubber parts such as automobile suspension bumpers, auto exhaust hangers, and body mounts.

Examples 1-10: Different compositions having formulations shown in Table 1 are prepared. Chemicals other than sulfur and a vulcanization accelerator were kneaded with a 0.2L enclosed mixer at the temperature at the discharge of 150° C. for 5.5 minutes to obtain a kneaded product. Then the kneaded product was re-milled for 4 minutes up to a temperature of 145° C. Then, the kneaded product, sulfur and the vulcanization accelerator, were mixed using the same mixer for 2 minutes until the temperature reached 100° C. to obtain an unvulcanized rubber composition. The obtained unvulcanized rubber composition was formed. Rubber sample preparation for testing was done according to ISO 23529:2010.

In the formulations, SBC1 is a controlled distribution S-E/B/S-S midblock copolymer, SBC2 is a high molecular weight, high vinyl styrene-(ethylene/butylene)-styrene or SEBS block copolymer, SBC3 is also a controlled distribution S-E/B/S-S midblock copolymer, SBC4 is a styrenic block copolymer, and SBC5 is a styrenic block copolymer, all having properties as listed in Tables 2 & 3:

TABLE 2

| Example # | MW of copolymer (Kg/mol) | True peak MW of styrene block (Kg/mol) | Total PSC wt. % | Mid-block Polystyrene content (wt. %) | Total blockiness (%) | Mid-block styrene blockiness (%) | Coupling efficiency (%) |
|---|---|---|---|---|---|---|---|
| SBC1 | 138 | 7.2 | 34.5 | 20.0 | 45 | — | 93 |
| SBC2 | 382 | 48.8 | 35 | 0 | 35 | 0 | — |
| SBC3 | 122 | 15.7 | 60 | 26 | <58 | — | — |
| SBC4 | 101 | 9.4 | 54 | 40 | 42.7 | 7.5 | 88 |
| SBC5 | 187 | 13.5 | 67 | 50 | 33.3 | — | 93 |

TABLE 2

| Polymer Example # | MFR | Shore A hardness | $T_g$ | ODT (° C.) |
|---|---|---|---|---|
| SBC1 | 48 | 45 | 9 | — |
| SBC2 | N/A | 69 | — | — |
| SBC3 | <1 | 78 | — | — |
| SBC4 | 6.4 | 71 | 24.7 | 210-220 |
| SBC5 | 4.7 | 70 | 23.4 | 260-270 |

Test Methods & Indicators: DMA properties by a temperature-sweep in double shear mode from −60° C. to 100° C. with 1° C./min at 10 Hz and 0.1% (−60° C. till −5° C.) and 3% (−5° C. till 100° C.) dynamic strain were measured using a Metravib +450N. Other test indicators included: wet grip indicator— tan delta at 0° C. (tan δ0° C.), rolling resistance indicator— tan delta at 60° C. (tan δ60° C.), and dry handling indicator—storage modulus at 30° C. (G' 30° C.). Various indices are calculated based on the reference formulation, with high values giving better performance.

Wet Grip index: Wet Grip indicator sample/Wet Grip indicator reference.

Rolling Resistance index: Rolling Resistance indicator reference/Rolling Resistance indicator sample.

Dry Handling index: Dry Handling indicator sample/Dry Handling indicator reference.

All the property indicators are normalized against the value found into for reference samples, which do not containing any SBC. Results are shown in Table 4.

TABLE 4

| Index type | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Wet Grip | 100 | 99 | 100 | 104 | 109 | 112 | 107 | 113 | 116 |
| Rolling resistance | 100 | 92 | 98 | 102 | 100 | 99 | 98 | 95 | 94 |
| Dry Handling | 100 | 131 | 122 | 103 | 112 | 122 | 106 | 117 | 128 |

As shown, when Examples containing HSBC is compared against the Example with no HSBC composition, there is an improvement in wet grip, rolling resistance as well as dry handling.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

| Components | 1 | 2 | 3 | 4 | 5 | 6 | 7 | 8 | 9 | 10 |
|---|---|---|---|---|---|---|---|---|---|---|
| Solution styrene butadiene rubber | 48.1 | 34.38 | 34.38 | 34.38 | 34.38 | 27.5 | 20.63 | 34.38 | 27.5 | 20.63 |
| Solution high-cis 1:4 polybutadiene | 30 | 30 | 30 | 30 | 30 | 30 | 30 | 30 | 30 | 30 |
| SBC1 | — | 10 | — | — | — | — | — | — | — | — |
| SBC2 | — | — | 10 | — | — | — | — | — | — | — |
| SBC3 | — | — | — | 10 | — | — | — | — | — | — |
| SBC4 | — | — | — | — | 10 | 15 | 20 | — | — | — |
| SBC5 | — | — | — | — | — | — | — | 10 | 15 | 20 |
| Solution styrene butadiene rubber | 35 | 35 | 35 | 35 | 35 | 35 | 35 | 35 | 35 | 35 |
| Silica surface area of 175 m$^2$/g | 80 | 80 | 80 | 80 | 80 | 80 | 80 | 80 | 80 | 80 |
| Carbon black surface area 118 m$^2$/g | 5 | 5 | 5 | 5 | 5 | 5 | 5 | 5 | 5 | 5 |
| Bis[3-(triethoxysilyl)propyl]polyfulide | 8 | 8 | 8 | 8 | 8 | 8 | 8 | 8 | 8 | 8 |
| TDAE Oil | 20 | 23.7 | 23.7 | 23.7 | 23.7 | 25.6 | 27.5 | 23.7 | 25.6 | 27.5 |
| Antioxidant CAS# 000101-72-4 | 1 | 1 | 1 | 1 | 1 | 1 | 1 | 1 | 1 | 1 |
| Antioxidant CAS# 000793-24-8 | 2 | 2 | 2 | 2 | 2 | 2 | 2 | 2 | 2 | 2 |
| Antioxidant Acetoanil polymer | 0.5 | 0.5 | 0.5 | 0.5 | 0.5 | 0.5 | 0.5 | 0.5 | 0.5 | 0.5 |
| Blend of paraffins and microwaxes | 1 | 1 | 1 | 1 | 1 | 1 | 1 | 1 | 1 | 1 |
| Zinc Oxide | 3 | 3 | 3 | 3 | 3 | 3 | 3 | 3 | 3 | 3 |
| Stearic Acid | 2 | 2 | 2 | 2 | 2 | 2 | 2 | 2 | 2 | 2 |
| Modified polymeric sulfur | 1.9 | 1.9 | 1.9 | 1.9 | 1.9 | 1.9 | 1.9 | 1.9 | 1.9 | 1.9 |
| N-cyclohexyl-2-benzothiazolesulfenamide | 2.5 | 2.5 | 2.5 | 2.5 | 2.5 | 2.5 | 2.5 | 2.5 | 2.5 | 2.5 |
| Diphenyl guanidine | 2.3 | 2.3 | 2.3 | 2.3 | 2.3 | 2.3 | 2.3 | 2.3 | 2.3 | 2.3 |

The invention claimed is:

1. A tire composition comprising, based on 100 parts total diene elastomers:
   a first diene elastomer in an amount of 5 to 95 phr, selected from polybutadienes, natural rubber, synthetic polyisoprenes, butadiene copolymers, isoprene copolymers and mixtures thereof;
   a second diene elastomer in an amount of 5 to 50 phr, comprising a hydrogenated styrenic block copolymer (HSBC);
   from 50 to 200 phr of a filler; and
   from 0-70 phr of a resin, a plasticizer, or combinations thereof;
   wherein the HSBC has a general configuration A-B-A, (A-B-)$_n$, (A-B-A-)$_n$, (A-B-A)$_n$X, (A-B-)$_n$X, or mixtures thereof, where n is an integer from 2 to 30, and X is residue of a coupling agent,
   wherein prior to hydrogenation,
   each A block is a monoalkenyl arene homopolymer block having a true peak molecular weight of 5 kg/mol to 15 kg/mol,
   each B block is a controlled distribution copolymer block of at least one conjugated diene and at least one monoalkenyl arene, and has a true peak molecular weight of 30 kg/mol to 200 kg/mol;
   wherein the HSBC has a midblock monoalkenyl arene blockiness index of 3% to 15%, wherein the mono alkenyl arene blockiness index is the proportion of mono alkenyl arene units in the block B having two mono alkenyl arene neighbors on the polymer chain;
   wherein subsequent to hydrogenation, 0-10% of the arene double bonds have been reduced, and at least 90% of the conjugated diene double bonds have been reduced;
   wherein the HSBC has a midblock poly(monoalkenyl arene) content of 20 wt. % to 50 wt. % based on the total weight of the midblock;
   and wherein the HSBC has a melt flow ratio of 1.0 to 50.0 measured according to ASTM D-1238 at 230° C. and 2.16 kg load, a Shore A hardness of 40 to 80 measured according to ASTM D-2240, a DMA peak tan delta temperature of 0° C. to 40° C. at 1 Hz measured according to ASTM D-4065, and an order-disorder transition temperature of 200° C. to 300° C.

2. The tire composition of claim 1, wherein the composition comprises less than 20 phr of a resin selected from substituted or unsubstituted cyclopentadiene (CPD) homopolymer or copolymer resins, substituted or unsubstituted dicyclopentadiene (DCPD or (D)CPD) homopolymer or copolymer resins, terpene homopolymer or copolymer resins, rosin derived resins, rosin esters, pinene homopolymer or copolymer resins, C5 fraction homopolymer or copolymer resins, C9 fraction homopolymer or copolymer resins, alpha-methylstyrene homopolymer or copolymer resins, (D)CPD/vinylaromatic copolymer resins, (D)CPD/terpene copolymer resins, terpene/phenol copolymer resins, (D)CPD/pinene copolymer resins, pinen/phenol copolymer resins, (D)CPD/C5 fraction copolymer resins, (D)CPD/C9 fraction copolymer resins, terpene/vinyl aromatic copolymer resins, terpene/phenol copolymer resins, pinene/vinylaromatic copolymer resins, pinene/phenol resins, C5 fraction/vinylaromatic copolymer resins, and combinations thereof.

3. The tire composition of claim 2, wherein the composition comprises 0-10 phr of the resin.

4. The tire composition of claim 1, wherein the composition comprises less than 35 phr of a plasticizer selected from aliphatic acid esters, hydrocarbonprocessing oils, tall oil pitch, modified tall oil pitch, and combinations thereof.

5. The tire composition of claim 1, wherein the composition comprises 5-25 phr of the plasticizer.

6. The tire composition of claim 1, wherein the second diene elastomer is present in an amount of at least 10 phr.

7. The tire composition of claim 1, wherein the HSBC has a general configuration (A-B-A)$_n$X, (A-B)$_n$X, or mixtures thereof, and a coupling efficiency of 30-90%.

8. The tire composition of claim 1, wherein the second diene elastomer comprises:
   a linear HSBC having a general configuration A-B-A, (A-B-)n, (A-B-A-)n, or combinations thereof and a total apparent number average molecular weight from 70 to 150 kg/mol; and
   a branched HSBC having a general configuration (A-B-A-)$_n$X, (A-B-)$_n$X, or combinations thereof and a total apparent number average molecular weight from 35 to 75 kg/mol per arm.

9. The tire composition of claim 1, wherein each B block has
terminal regions adjacent to the A blocks that are rich in conjugated diene units and one or more regions not adjacent to the A blocks that are rich in mono alkenyl arene units,
10 to 40 wt. % of polymerized mono alkenyl arene units,
a styrene blockiness index of less than 10%; and
a vinyl content of at least 40 mole percent.

10. The tire composition of claim 1, wherein the HSBC has a midblock vinyl content from 30 mol percent to 90 mol percent.

11. The tire composition of claim 1, wherein the HSBC has a total poly(monoalkenyl arene) content of 30 wt. % to 70 wt. %.

12. The tire composition of claim 1, wherein the first diene elastomer is end-group functionalized.

13. The tire composition of claim 12, wherein the first diene elastomer is end-group functionalized with a C—Sn bond, an amino group, a silanol group, a polysiloxane group, or an epoxy group.

14. The tire composition of claim 1, wherein the HSBC has a tensile strength of 10 MPa to 30 Mpa.

15. The tire composition of claim 1, wherein the HSBC has a rate of change of elastic modulus ($\Delta G_{0° C.-40° C.}$) from −9 MPa/° C. to −25 MPa/° C. over a temperature range from 0° C. to 40° C. measured according to ASTM 1640-99.

16. The tire composition of claim 1, wherein the HSBC has an elongation of 500% to 1000%.

17. The tire composition of claim 2, wherein the HSBC has an order-disorder temperature (ODT) in the range of 200° C.-300° C.

18. The tire composition of claim 1, wherein the first diene elastomer is selected from natural rubber (NR), butadiene rubber (BR), synthetic polyisoprene rubber, epoxylated natural rubber, polybutadiene rubber, nitrile-hydrogenated butadiene rubber NHBR, hydrogenated styrene-butadiene rubber HSBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, polyamide elastomers, and mixtures thereof.

19. An extruded, compression-molded, blow-molded, injection-molded, or laminated rubber part comprising:
a first diene elastomer in an amount of 5 to 95 phr, selected from polybutadienes, natural rubber, synthetic polyisoprenes, butadiene copolymers, isoprene copolymers and mixtures thereof;
a second diene elastomer in an amount of 5 to 50 phr, comprising a hydrogenated styrenic block copolymer (HSBC);
from 50 to 200 phr of a filler; and
from 0-70 phr of a resin, a plasticizer, or combinations thereof;
wherein the HSBC has a general configuration A-B-A, (A-B-)$_n$, (A-B-A-)$_n$, (A-B-A-)$_n$X, (A-B-)$_n$X, or mixtures thereof, where n is an integer from 2 to 30, and X is residue of a coupling agent,
wherein prior to hydrogenation,
each A block is a monoalkenyl arene homopolymer block having a true peak molecular weight of 5 kg/mol to 15 kg/mol,
each B block is a controlled distribution copolymer block of at least one conjugated diene and at least one monoalkenyl arene, and has a true peak molecular weight of 30 kg/mol to 200 kg/mol;
wherein the HSBC has a midblock monoalkenyl arene blockiness index of 3% to 15%, wherein the mono alkenyl arene blockiness index is the proportion of mono alkenyl arene units in the block B having two mono alkenyl arene neighbors on the polymer chain;
wherein subsequent to hydrogenation, 0-10% of the arene double bonds have been reduced, and at least 90% of the conjugated diene double bonds have been reduced;
wherein the HSBC has a midblock poly(monoalkenyl arene) content of 20 wt. % to 50 wt. % based on the total weight of the midblock;
and wherein the HSBC has a melt flow ratio of 1.0 to 50.0 measured according to ASTM D-1238 at 230° C. and 2.16 kg load, a Shore A hardness of 40 to 80 measured according to ASTM D-2240, a DMA peak tan delta temperature of 0° C. to 40° C. at 1 Hz measured according to ASTM D-4065, and an order-disorder transition temperature of 200° C. to 300° C.

20. The rubber part of claim 19, wherein the rubber part comprises less than 20 phr of a resin selected from substituted or unsubstituted cyclopentadiene (CPD) homopolymer or copolymer resins, substituted or unsubstituted dicyclopentadiene (DCPD or (D)CPD) homopolymer or copolymer resins, terpene homopolymer or copolymer resins, rosin derived resins, rosin esters, pinene homopolymer or copolymer resins, C5 fraction homopolymer or copolymer resins, C9 fraction homopolymer or copolymer resins, alpha-methylstyrene homopolymer or copolymer resins, (D)CPD/vinylaromatic copolymer resins, (D)CPD/terpene copolymer resins, terpene/phenol copolymer resins, (D)CPD/pinene copolymer resins, pinen/phenol copolymer resins, (D)CPD/C5 fraction copolymer resins, (D)CPD/C9 fraction copolymer resins, terpene/vinyl aromatic copolymer resins, terpene/phenol copolymer resins, pinene/vinylaromatic copolymer resins, pinene/phenol resins, C5 fraction/vinylaromatic copolymer resins, and combinations thereof.

* * * * *